United States Patent
Kim (10) Patent No.: US 8,135,092 B2
(45) Date of Patent: Mar. 13, 2012

(54) MIMO-OFDM WIRELESS COMMUNICATION SYSTEM

(75) Inventor: Kyeong Jin Kim, Irving, TX (US)

(73) Assignee: Nokia Corporation, Espoo (FI)

( * ) Notice: Subject to any disclaimer, the term of this patent is extended or adjusted under 35 U.S.C. 154(b) by 548 days.

(21) Appl. No.: 12/322,362

(22) Filed: Jan. 30, 2009

(65) Prior Publication Data

US 2009/0195453 A1 Aug. 6, 2009

Related U.S. Application Data

(60) Provisional application No. 61/063,218, filed on Jan. 31, 2008.

(51) Int. Cl.
*H03D 1/24* (2006.01)

(52) U.S. Cl. ......... 375/320; 375/316; 375/267; 342/373

(58) Field of Classification Search .................. 375/320, 375/267, 316; 342/373
See application file for complete search history.

(56) References Cited

U.S. PATENT DOCUMENTS

| | | | |
|---|---|---|---|
| 2003/0108117 A1* | 6/2003 | Ketchum et al. | 375/295 |
| 2006/0239374 A1* | 10/2006 | Aldana et al. | 375/267 |
| 2007/0167192 A1* | 7/2007 | Li et al. | 455/562.1 |
| 2007/0280367 A1 | 12/2007 | Nakao et al. | 375/260 |
| 2009/0154600 A1* | 6/2009 | Kim et al. | 375/320 |

FOREIGN PATENT DOCUMENTS

WO WO-2008/038110 A2 4/2008

OTHER PUBLICATIONS

Hiroshi Nishimoto et al., "Channel Estimation with Space-Time Windowing in MIMO PE-SDM Transmission", Vehicular Technology Conference, 2007, Sep. 1, 2007, IEEE 66$^{th,}$ pp. 541-545, XP031147462.

Huaning Niu et al., "Beamforming for Space-Time Coded IEEE 802.11n System with Known Fading Correlations", Signals, Systems and Computers, 2005, Conference Record of the Thirty-Ninth Asilomar Conference on, Pacific Grove, California, Oct. 28, 2005, pp. 1014-1018, XP010900161.

(Continued)

*Primary Examiner* — Shuwang Liu
*Assistant Examiner* — Michael Neff
(74) *Attorney, Agent, or Firm* — Harrington & Smith (57) ABSTRACT

A MIMO channel frequency response matrix is decomposed into a frequency-related part and a constant part. The constant part is independent of subcarrier index and of number of subcarriers in one symbol interval. Separated QR decomposition and either SVD or GMD is applied to the two parts. A right unitary matrix (R) is obtained from the SVD or GMD applied to the constant part. QR decomposition is applied to the constant part to generate a beamforming matrix (V). In another embodiment, a selection criterion based on a correlation matrix distance is used to select a beamforming matrix that is independent of subcarrier, the selected matrix is retrieved from a local memory and applied to a received signal. Noise covariance is computed for a noise expression which considers interference generated from the applied beamforming matrix. Data detection is performed on the received signal by a MIMO data detector using the noise covariance.

8 Claims, 5 Drawing Sheets

OTHER PUBLICATIONS

Patrick Svedman et al., "Exploiting Temporal Channel Correlation in Opportunistic SD-OFDMA", Communications, 2006, IEEE International Conference on, Jun. 1, 2006, pp. 5307-5312, XP031025758.

"On the Achievable Throughput of a Multiantenna Gaussian Broadcast Channel", Giuseppe Caire, et al., IEEE Transactions on Information Theory, vol. 49, No. 7, Jul. 2003, pp. 1691-1706.

"Spatio-Temporal Coding for Wireless Communication", Gregory G. Raleigh, et al., IEEE Transactions on Communications, vol. 46, No. 3, Mar. 1998, pp. 357-366.

"On the Capacity of OFDM-Based Spatial Multiplexing Systems", Helmut Boleskei et al., IEEE Transactions on Communications, Oct. 2001, 28 pgs.

"Interpolation Based Transmit Beamforming for MIMO-OFDM With Limited Feedback", Jihoon Choi, et al., IEEE Transactions on Signal Processing, vol. 53, No. 11, Nov. 2005, pp. 4125-4135.

"Transmit Beamforming in Multiple-Antenna systems With Finite Rate Feedback: A VG-Based Approach", June Chul Roh, et al., IEEE Transactions on Information Theory, vol. 52, No. 3, Mar. 2006, pp. 1101-1112.

Grassmannian Beamforming for Multiple-Input Multiple-Output Wireless Systems, David J. Loveland et al., IEEE Jun. 2003, 29 pgs.

Algorithms for Quantized Precoding in MIMO OFDM Beamforming Systems, Bishwarup Mondal et al., Wireless Networking and Communicatins Group, The University of Texas, Feb. 2005, 8 pgs.

"Recursive andTrellis-Based Feedback Reduction for MIMO-OFDM with Rate-Limited Feedback", Shengli Zhou et al., IEEE Transactions on Wireless Communications, vol. 5, No. 12, Dec. 2006, pp. 3400-3405.

"A QRD-M/Kalman Filter-Based Detection and Channel Estimation Algorithm for MIMO-OFDM Systems", Kyeong Jin Kim, et al., IEEE Transactions on Wireless Communications, vol. 4, No. 2, Mar. 2005, pp. 710-721.

"Joint Transceiver Design for MIMO Communications Using Geometric Mean Decomposition", Yi Jiang et al., IEEE Transactions on Signal Processing, vol. 53, No. 10, Oct. 2005, pp. 3791-3803.

"Opportunistic Scheduling and Beamforming for MIMO-OFDMA Downlink systems with Reduced Feedback", Man-On Pun, et al., Dept. of Electrical Engineering, Princeton University, 5 pgs.

"A Novel Beamforming Method for MIMO-OFSM Systems With Reduced Feedback", Kyeong Jin Kim et al., Croucher Foundation, 5 pgs.

"Correlation Matrix Distance, a Meaningful Measure for Evaluation of Non-Stationary MIMO Channels", Markus Herdin et al., IEEE 2005, 5 pgs.

* cited by examiner

FIG.5

# MIMO-OFDM WIRELESS COMMUNICATION SYSTEM

CROSS REFERENCE TO RELATED APPLICATION

This patent application claims priority under 35 U.S.C. §119(e) from U.S. Provisional Patent Application No. 61/063,218, filed Jan. 31, 2008, which is incorporated by reference herein in its entirety.

TECHNICAL FIELD

The exemplary and non-limiting embodiments of this invention relate generally to wireless communication systems, methods, devices and computer programs and, more specifically, relate to techniques for performing beamforming in a MIMO-OFDM type of wireless communication system.

BACKGROUND

Various abbreviations that appear in the specification and/or in the drawing figures are defined as follows:
 3GPP 3rd generation partnership project
 ASIC application specific integrated circuit
 BER bit error rate
 DFT discrete Fourier transform
 GMD geometric means decomposition
 IMT international mobile telecommunications
 MIMO multiple input multiple output
 OFDM orthogonal frequency division multiplexing
 QLD QL decomposition
 QRD QR decomposition
 SVD singular value decomposition
 VQ vector quantization
 WIMAX worldwide interoperability for microwave access (IEEE 802.16)
 WLAN wireless local area network The SVD-based beamforming (SVD-BF) has been known to provide a good beamforming performance to achieve an adequate capacity. Optimal beamforming requires channel state information in the form of the beamforming matrix for each MIMO-OFDM subcarrier (see, for example, G. G. Raleigh and J. M. Cioffi, "SPATIO-TEMPORAL CODING FOR WIRELESS COMMUNICATION," IEEE Trans. on Commun., vol. 46, pp. 357-366, March 1998; and H. Bölcskei and A. J. Paulraj, "ON THE CAPACITY OF OFDM-BASED SPATIAL MULTIPLEXING SYSTEMS," IEEE Trans. on Commun., vol. 50, pp. 225-234, February 2002). However, application of SVD-BF is limited for use to a narrow bandwidth MIMO system. In a MIMO-OFDM system SVD-BF is implemented on a per subcarrier basis and, as a result, as the DFT size increases the computational burden to find beamforming matrix and feedback requirements per subcarrier also increases (see, for example, J. Choi and R. W. Heath, "INTERPOLATION BASED TRANSMIT BEAMFORMING FOR MIMO-OFDM WITH LIMITED FEEDBACK," IEEE Trans. on Signal Processing, vol. 53, pp. 4125-4135, December 2005). Also, SVD-BF is generally difficult to implement in a limited feedback closed-loop environment.

One previously proposed solution is to use a quantized feedback to convey the channel information to the transmitter. In Choi et al. a limited feedback architecture that combines beamforming vector quantization and smart vector interpolation is proposed. In this system, the receiver feeds back a fraction of the information about the optimal beamforming matrices to the transmitter and the transmitter computes the beamforming matrices for all subcarriers through interpolation.

In a VQ-based beamforming method a generalized Lloyd algorithm (J. C. Roh and B. D. Rao, "TRANSMIT BEAMFORMING IN MULTIPLE-ANTENNA SYSTEMS WITH FINITE RATE FEEDBACK: A VQ-BASED APPROACH," IEEE Trans. on Inform. Theory, vol. 52, pp. 110'-1112, 2006) or a Grassmannian method has been used to design the beamformer (D. J. Love, R. W. H. Jr., and T. Strohmer, "GRASSMANNIAN BEAMFORMING FOR MULTIPLE-INPUT MULTIPLE-OUTPUT WIRELESS SYSTEMS," IEEE Trans. on Inform. Theory, vol. 49, pp. 2735-2747, 2003).

The sharing of codebooks in the transmitter and the receiver can be used to reduce the feedback information. This basic approach has been proposed for use over frequency-selective channels (see B. Mondal and R. W. H. Jr., "ALGORITHMS FOR QUANTIZED PRECODING IN MIMO OFDM BEAMFORMING SYSTEMS," Proc. SPIE Int. Soc. Opt. Eng., vol. 5847, pp. 80-87, 2005), which clusters a group of subcarriers and chooses a common frequency-domain representation of the channel information for each group. In S. Zhou, B. Li, and P. Willetty, "RECURSIVE AND TRELLIS-BASED FEEDBACK REDUCTION FOR MIMO-OFDM WITH RATE-LIMITED FEEDBACK," IEEE Trans. on Wireless Communications, vol. 5, pp. 3400-3405, December 2006, each beamforming vector is drawn from a codebook with finite size. The receiver determines the optimal beamforming vector on each subcarrier depending on the channel realization, and informs the transmitter. Using the fact that the channel responses across OFDM subcarriers are highly correlated, the amount of information to be fed back can be reduced by selecting the optimal beamforming vectors sequentially across the subcarriers.

To reduce the amount of feedback information and the computational complexity, a quasi-SVD-BF method was proposed to use only one feedback of the beamforming matrix (see K. J. Kim, M. O. Pun, and R. A. Iltis, "QRD-BASED PRECODED MIMO-OFDM SYSTEMS WITH REDUCED FEEDBACK", ICC2008, pp. 708-712, May 2008).

SUMMARY

A first exemplary embodiment of the invention is a method comprising: decomposing a multiple input multiple output channel frequency response matrix into a frequency-related part and into a constant part, where the constant part is independent of a subcarrier index and of a total number of subcarriers used in one symbol interval over which the channel frequency response matrix remains constant; applying separated QR decomposition and either singular value decomposition or geometric means decomposition to the frequency-related part and the constant part of the channel frequency response matrix; obtaining a right unitary matrix (R) from the said singular value decomposition or geometric means decomposition applied to the constant part of the channel frequency response matrix, where the constant part of the channel frequency response matrix comprises channel impulse responses in a time domain; and applying QR decomposition to the constant part of the channel frequency response matrix to generate a beamforming matrix (V).

Another exemplary embodiment of the invention is an apparatus that comprises a processor configured to: decompose a multiple input multiple output channel frequency response matrix into a frequency-related part and into a constant part, where the constant part is independent of a subcarrier index and of a total number of subcarriers used in one symbol interval over which the channel frequency response matrix remains constant; apply QR decomposition and either singular value decomposition or geometric means decomposition to the frequency-related part and the constant part; obtain a right unitary matrix (R) from the said singular value decomposition or geometric means decomposition applied to the constant part of the channel frequency response matrix, where the constant part of the channel frequency response matrix comprises channel impulse responses in a time domain; and apply QR decomposition to the constant part of the channel frequency response matrix to generate a beamforming matrix (V).

A further exemplary embodiment of the invention is a method comprising: applying selection criterion based on a correlation matrix distance to select a beamforming matrix that is independent of a subcarrier to which the beamforming matrix is to be applied; obtaining the selected beamforming matrix from a local memory; applying the obtained beamforming matrix to a received signal; computing noise covariance for a noise expression which considers interference generated from the applied beamforming matrix; and performing data detection on the received signal by a multiple input multiple output data detector using the noise covariance.

A still further exemplary embodiment of the invention is an apparatus comprising a processor and a detector. The processor is configured to: apply a selection criterion based on correlation matrix distance to select a beamforming matrix that is independent of a subcarrier to which the beamforming matrix is to be applied; obtain from a local memory the selected beamforming matrix; apply the obtained beamforming matrix to a received signal; and compute noise covariance for a noise expression which considers interference generated from the applied beamforming matrix. The detector is a multiple input multiple output data detector which is configured to perform data detection on the received signal using the noise covariance.

DETAILED DESCRIPTION

The exemplary embodiments of this invention enable, with certain operations performed on the MIMO channel matrix, feedback of only one beamforming matrix to the transmitter over the MIMO-OFDM system. The use of these exemplary embodiments enables a significant reduction in the amount of feedback as the number of subcarriers increases, which is a clear advantage made possible by the use of these exemplary embodiments. It can be shown that the exemplary embodiments provide enhanced performance as compared to SVD-based and QRD-based transmission schemes at a full spatial-rate transmission.

The exemplary embodiments provide a novel channel decomposition method, one using a technique referred to as GMD, to further improve the performance. Reference may be had to Y. Jiang, J. Li, and W. Hager, "JOINT TRANSCEIVER DESIGN FOR MIMO COMMUNICATIONS USING GEOMETRIC MEAN DECOMPOSITION," *IEEE Trans. on Signal Processing*, vol. 53, pp. 3791-3803, October 2005, for a description of geometric mean decomposition. Reference may also be made to U.S. Provisional Patent Application No. 60/827,537, filed Sep. 26, 2006, now international application PCT WO2008/038110.

Figure 1:
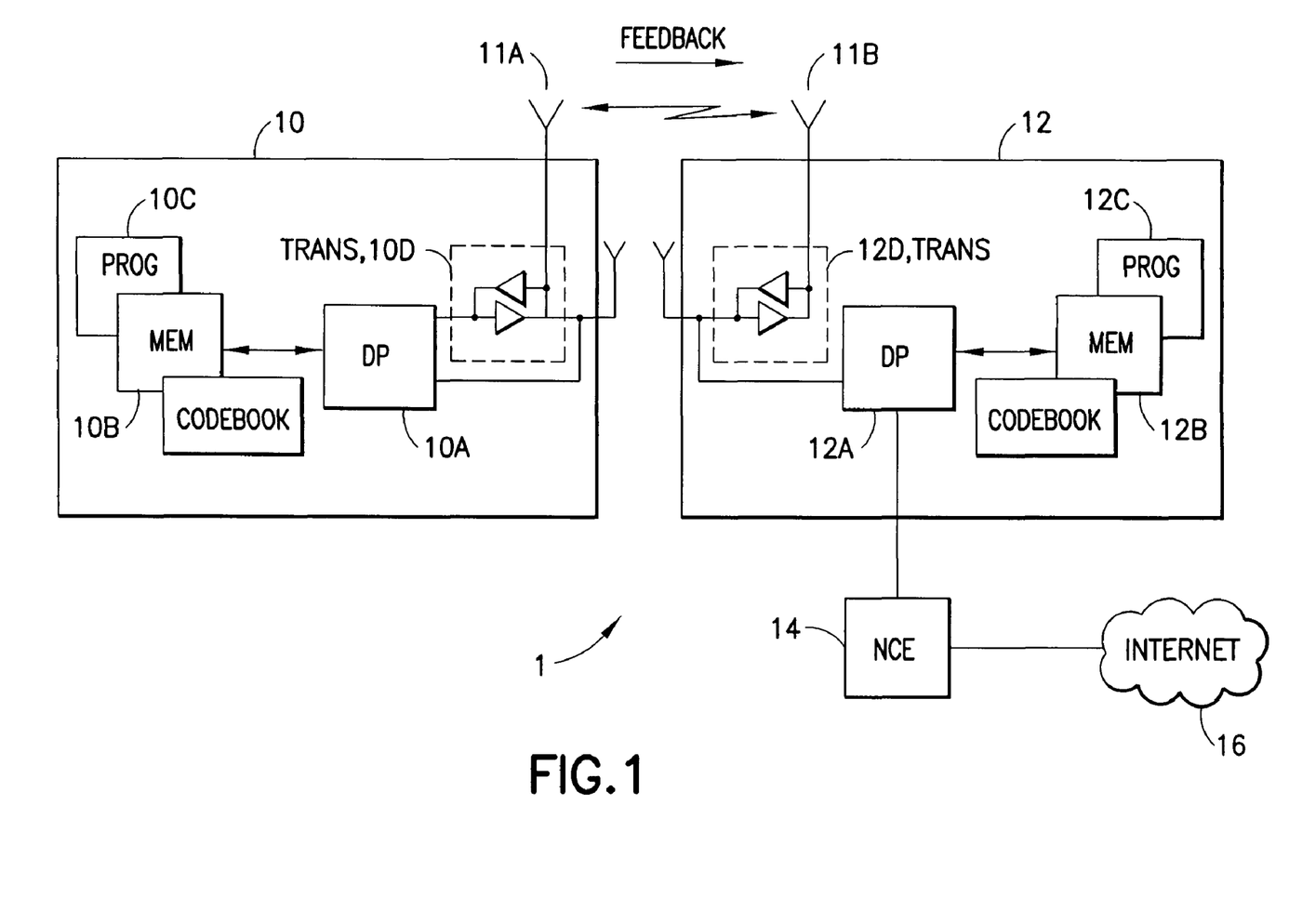
FIG. 1 shows a simplified block diagram of various electronic devices that are suitable for use in practicing the exemplary embodiments of this invention, including an access node and a mobile device.

Reference is made first to FIG. 1 for illustrating a simplified block diagram of various electronic devices that are suitable for use in practicing the exemplary embodiments of this invention. In FIG. 1 a wireless network 1 is adapted for communication with an apparatus 10 (which may be embodied as a mobile communication device) via a base station or access point or node 12. The wireless network 1 may include a network control element (NCE) 14. The apparatus 10 includes a data processor (DP) 10A, a memory (MEM) 10B that stores a program (PROG) 10C, and a suitable radio frequency (RF) transceiver 10D for bidirectional wireless communications with the access node 12, which also includes a DP 12A, a MEM 12B that stores a PROG 12C, and a suitable RF transceiver 12D. The access node 12 may be coupled via a data path 13 to a network control element (NCE) 14 that also includes a DP 14A and a MEM 14B storing an associated PROG 14C. The NCE 14 may provide connectivity with a data communications network 16 such as the Internet. The PROGs 10C and 12C are assumed to include program instructions that, when executed by the associated DP, enable the electronic device to operate in accordance with the exemplary embodiments of this invention, as will be discussed below in greater detail.

That is, the exemplary embodiments of this invention may be implemented at least in part by computer software executable by the DP 10A of the apparatus 10 and by the DP 12A of the access node 12, or by hardware, or by a combination of software and hardware.

In general, the various embodiments of the apparatus 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, flash memory, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

In practice, there may be a plurality of transmitters and receivers 10D, 12D, and a plurality of receive and transmit antennas 11A, 11B at each of the apparatus 10 and the access node 12 for providing the MIMO wireless communication system 1.

The exemplary embodiments of this invention are now described in further detail.

Figure 2A:
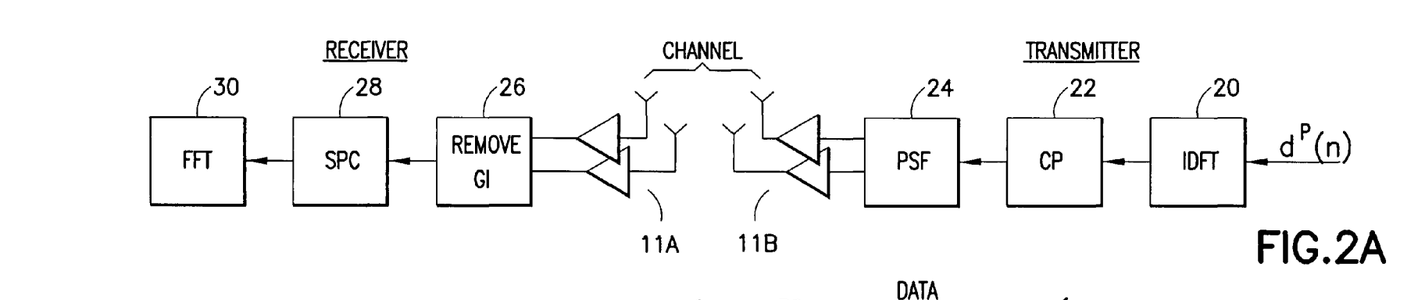
FIG. 2A is a more detailed view of the transmitter of the access node and the receiver of the mobile device of FIG. 1.
Figure 2B:
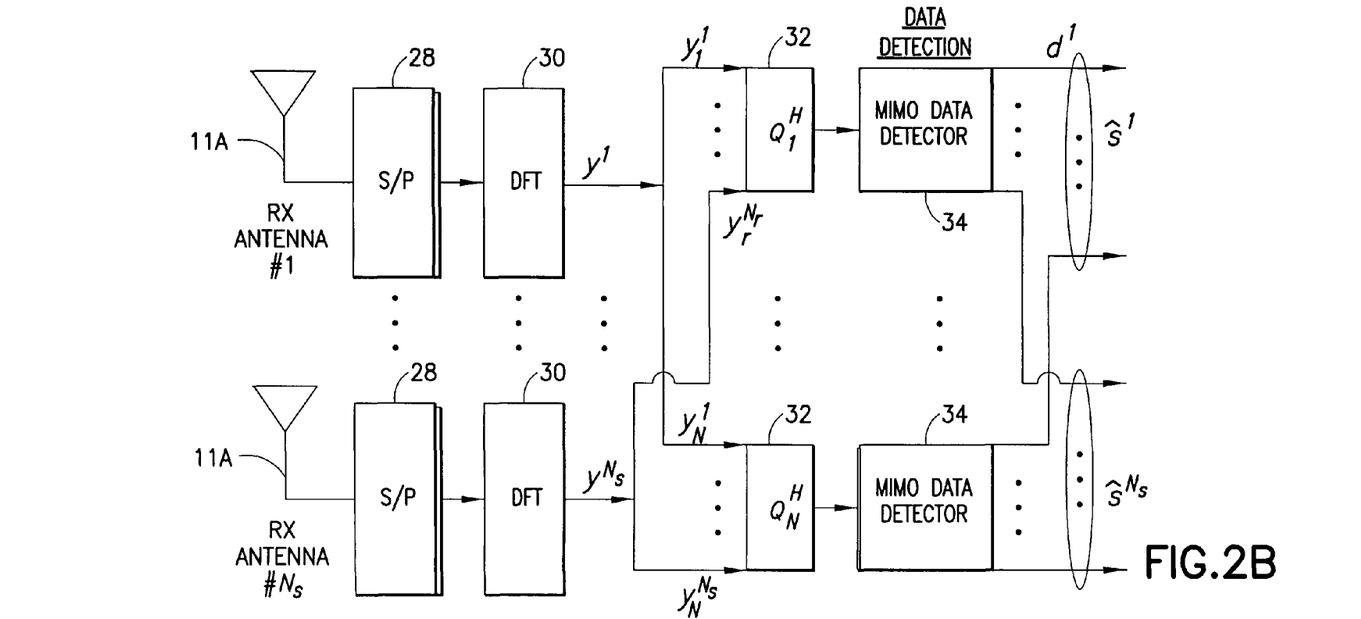
FIG. 2B is a more detailed view of the receiver shown in FIG. 2A.

Discussed first is a non-limiting example of a signal and channel model. Consider a MIMO-OFDM system with N subcarriers. Referring to FIGS. 2A and 2B, the MIMO system may be equipped with $N_r$ receive antennas 11A and $N_t$ transmit antennas 11B, respectively. One may denote the data symbols belonging to an n-th OFDM block transmitted from a p-th transmit antenna 11B as $d^p(n)=[d_1^p(n), \ldots, d_N^p(n)]^T$. For convenience, one may assume that the data symbols are taken from the same complex-valued finite alphabet and are independently, identically distributed (i.i.d). A transmitted vector symbol $d^p(n)$ is converted to the corresponding time-domain vector by an N-point inverse discrete Fourier transform (IDFT) unit 20. To prevent inter-symbol interference (ISI), a cyclic prefix (CP) of $N_g$ symbols is appended by CP unit 22 in front of each IDFT output block. The resulting vector of length $N_d^g = N_d + N_g$ is digital-to-analog converted by a pulse-shaping filter (PSF) $p_D(t)$ unit 24, with a finite support on $[0, T_d]$, where $T_d = NT_s$ with $T_s$ being the data symbol interval. The analog signal from the pulse-shaping filter unit 24, $\tilde{s}(t)$, is transmitted from the transmit antennas 11B over the channel.

The channel between the p-th transmit antenna and the q-th receive antenna during the n-th block, $\{h_l^{p,q}(n)\}$, may be modeled as a tapped delay line (TDL), where $0 \leq l \leq N_f - 1$ with $N_f$ being the channel order. Assume for convenience that the CP is sufficient to comprise the maximum path delay, i.e., $N_f \leq N_g T_s$. Furthermore, we may assume that $\{h_l^{p,q}(n)\}$ is constant over one transmission interval, but varies from transmission to transmission.

The received signal from the q-th receiver antenna 11A corresponding to the n-th symbol is given as $$r^q(t) = \sum_{p=1}^{N_t} \sum_{l=0}^{N_f-1} h_l^{p,q}(n) \tilde{s}^p(t - lT_s) + v^q(n), \quad (1)$$

where $v^q(t)$ is a circularly symmetric white Gaussian noise.

After the guard interval is removed from $r^q(t)$ in unit 26, the resulting signal is applied to serial-to-parallel converter (SPC) 28 to obtain the n-th received OFDM block signal from the q-th receiver antenna 11A given as $$r^q(n) = \sum_{p=1}^{N_t} D^p(n) h^{p,q}(n) + v^q(n), \quad (2)$$

where $$v^q(n) \sim N(v^q(n); 0, 2N_0/T_s I_N),$$
$$h^{p,q}(n) \triangleq [h_0^{p,q}(n), h_1^{p,q}(n), \ldots, h_{N_f-1}^{p,q}(n)]^T, \quad (3)$$

$$D^p(n) \triangleq \begin{bmatrix} d_0^p(n) & d_{N-1}^p(n) & \ldots & d_{N-N_f+1}^p(n) \\ d_1^p(n) & d_0^p(n) & \ldots & d_{N-N_f+2}^p(n) \\ \vdots & \vdots & \ldots & \ldots \\ d_{N-1}^p(n) & d_{N-2}^p(n) & \ldots & d_{N-N_f}^p(n) \end{bmatrix},$$

$$\tilde{d}^p(n) = W^H d^p(n),$$

where $W^H$ is the N-point IDFT matrix and $\tilde{d}^p(n)$ is the time-domain signal of $d^p(n)$.

Furthermore, $N(x; m_x, \Sigma_x)$ denotes a complex circular Gaussian distribution with mean vector $m_x$ and covariance matrix $\Sigma_x$. After applying a FFT operation at unit 30 one has $$y^q(n) = Wr^q(n) + Wv^q(n), \quad (4)$$
$$= \sum_{p=1}^{N_t} H^{p,q}(n) d^p(n) + z^q(n),$$

where $$H^{p,q}(n) = \text{diag}\{H_0^{p,q}(n), \ldots, H_{N-1}^{p,q}(n)\}, \quad (5)$$

$$H_k^{p,q}(n) \triangleq \sum_{l=0}^{N_f-1} h_l^{p,q} e^{-j2\pi lk/N} = w_k^T h^{p,q}(n),$$

$$w_k = [1, e^{-j2\pi k/N}, \ldots, e^{-j2(N_f-1)\pi k/N}]^T,$$

$$z^q(n) \sim N(z^q(n); 0, 2N_0/T_s I).$$

From (5) one may observe that if a channel $h^{p,q}(n)$ is constant during one transmission interval, the frequency fluctuation is primarily absorbed in the truncated FFT basis vector $w_k$. Using (4), the received vector signal for the k-th subcarrier is $$y_k(n) = H_k(n) d_k(n) + z_k(n). \quad (6)$$

where $y_k(n) \in \mathbb{C}^{N_r}$, $H_k(n) \in \mathbb{C}^{N_r \times N_t}$, and $z_k(n):N(z_k(n); 0, 2N_0/T_s I)$. The frequency channel matrix $H_k(n)$ becomes $$H_k(n) = \begin{bmatrix} w_k^T h^{1,1}(n) & w_k^T h^{2,1}(n) & \ldots & w_k^T h^{N_t,1}(n) \\ \vdots & \vdots & \ldots & \vdots \\ w_k^T h^{1,N_r}(n) & w_k^T h^{2,N_r}(n) & \ldots & w_k^T h^{N_t,N_r}(n) \end{bmatrix}. \quad (7)$$

Provided now is an overview of the quasi-SVD-beamforming method. The frequency channel matrix $H_k(n)$ is alternatively expressed as $$H_k(n) = \begin{bmatrix} w_k^T h^{1,1}(n) & w_k^T h^{2,1}(n) & \ldots & w_k^T h^{N_t,1}(n) \\ \vdots & \vdots & \ldots & \vdots \\ w_k^T h^{1,N_r}(n) & w_k^T h^{2,N_r}(n) & \ldots & w_k^T h^{N_t,N_r}(n) \end{bmatrix}, \quad (8)$$

$$= [I \otimes w_k^T] \begin{bmatrix} h^{1,1}(n) & h^{2,1}(n) & \ldots & h^{N_t,1}(n) \\ \vdots & \vdots & \ldots & \vdots \\ h^{1,N_r}(n) & h^{2,N_r}(n) & \ldots & h^{N_t,N_r}(n) \end{bmatrix},$$

$$= [I \otimes w_k^T] H(n),$$

where $\otimes$ denotes the Kronecker product. From (8) one may observe that only the first part is a function of subcarrier index k, while $H(n) \in \mathbb{C}^{H_t N_f \times N_t}$ is independent of k.

From this property one can apply separated SVDs to the MIMO channel matrix $H_k(n)$, $$H_k(n) = U_{W,k}(n) \Sigma_{W,k}(n) V_{W,k}^H(n) U_H(n) \Sigma_H(n) V_H^H(n). \quad (9)$$

From (8) it can readily be shown that $$U_{W,k}(n) = I_{N_r \times N_r}, V_{W,k}(n) \in \mathbb{C}^{N_r N_f \times N_r N_f}, \quad (10)$$

$$\sum_{W,k}(n) = \left[\sqrt{N_f} I_{N_r \times N_r} \mathbf{0}_{N_r \times (N_f-1)N_r}\right] \in \mathbb{C}^{N_r \times N_r N_f},$$

-continued $$U_H(n) \in \mathbb{C}^{N_rN_f \times N_rN_f}, V_H(n) \in \mathbb{C}^{N_t \times N_t},$$

$$\sum_H(n) = \begin{bmatrix} \tilde{\sum}_H(n) \\ O_{(N_fN_r-N_t) \times N_t} \end{bmatrix} \in \mathbb{C}^{N_rN_f \times N_t},$$

$$\tilde{\sum}_H(n) = \text{diag}\{\lambda_{H,1}(n), \ldots, \lambda_{H,\min(N_r,N_t)}(n), 0, \ldots, 0\} \in \mathbb{R}^{N_r \times N_t}.$$

Using (10) one obtains $$H_k(n) = [I_{N_r \times N_r} O_{N_r \times (N_f-1)N_r}] \Theta_k(n) \sum_H(n) V_H^H(n), \quad (11)$$

$$= \tilde{\Theta}_k(n) \sum_H(n) V_H^H(n),$$

$$= \overline{\Theta}_k(n) \tilde{\sum}_H(n) V_H^H(n).$$

In (11), $$\Theta_k(n) \triangleq \sqrt{N_f} V_{W,k}^H(n) U_H(n), \quad (12)$$

$$\tilde{\Theta}_k(n) \triangleq [\overline{\Theta}_k(n) O_{N_r \times (N_f-1)N_r}] \triangleq [I_{N_r \times N_r} O_{N_r \times (N_f-1)N_r}] \Theta_k(n)$$

Note that $\Theta_k(n)\Theta_k^H(n) = I_{N_rN_f}$, while $\overline{\Theta}_k(n)\overline{\Theta}_k^H(n) \neq I_{N_rN_f}$ and $\overline{\Theta}_k(n)\overline{\Theta}_k^H(n) \neq I_{N_r}$.

For a proper beamforming operation, a submatrix matrix $\tilde{\Theta}_k(n)$ or $\overline{\Theta}_k(n)$, a truncation of unitary matrix $\Theta_k(n)$, should be unitary also. Since a truncated unitary matrix is not unitary in general, we generate a unitary matrix applying the QR decomposition to $\overline{\Theta}_k(n)$ as follows $$H_k(n) = Q_k(n) R_k(n) \tilde{\sum}_H(n) V_H^H(n). \quad (13)$$

where $Q_k(n) \in \mathbb{C}^{N_r \times N_r}$ is unitary and $R_k(n)$ is upper triangular.

Using (13) one has $$H_k(n) = Q_k(n) R_{k,\Sigma}(n) V_H^H(n). \quad (14)$$

A new matrix, $R_{k,\Sigma}(n) \triangleq R_k \tilde{\sum}_H(n) \in \mathbb{C}^{N_r \times N_t}$, is also upper triangular, and whose diagonals are multiplied by singular values of $\tilde{\sum}_H(n)$.

Note that a channel decomposition specified in (14) is similar to what is described by Y. Jiang, J. Li, and W. Hager, "JOINT TRANSCEIVER DESIGN FOR MIMO COMMUNICATIONS USING GEOMETRIC MEAN DECOMPOSITION," *IEEE Trans. on Signal Processing*, vol. 53, pp. 3791-3803, October 2005, as well as by G. Caire and S. Shamai, "ON THE ACHIEVABLE THROUGHPUT OF A MULTIANTENNA GAUSSIAN BROADCAST CHANNEL," *IEEE Trans. on Inform. Theory*, vol. 49, pp. 1691-1706, 2003, and by K. J. Kim, J. Yue, R. A. Iltis, and J. D. Gibson, "A QRD-M/KALMAN FILTER-BASED DETECTION AND CHANNEL ESTIMATION ALGORITHM FOR MIMO-OFDM SYSTEMS," *IEEE Trans. on Wireless Communications*, vol. 4, pp. 710-721, March 2005. In Jiang et al. $R_k(n)$ is the upper triangular matrix with equal diagonals, but the precoding matrix (here matrix V(n)) is a function of subcarrier index. In Caire et al. and Kim et al. an upper triangular matrix is also obtained by applying the QR decomposition to the channel matrix with V(n)=I. Note that while $V_H(n)$ is independent of a subcarrier index, the beamforming matrix is a function of subcarrier index k. This is a significant advantage and provides a new SVD-based beamforming method with a very limited feedback.

Described now is the GMD based closed-loop beamforming in accordance with the exemplary embodiments of this invention.

Based at least in part on the foregoing description of the quasi-SVD-beamforming method, a different matrix decomposition to a channel matrix is used:

$$H_k(n) = [I \otimes w_k^T] Q_H(n) R_H(n) P_H^H(n). \quad (15)$$

Note that in (15) matrices $Q_H(n)$ and $P_H(n)$ are still unitary matrices, but $R_H(n)$ is upper triangular matrix with equal diagonal elements along its diagonal. Using this matrix decomposition one can achieve enhanced diversity gain as compared to the original QR decomposition. The QR decomposition is applied to the matrix $[I \otimes w_k^T] Q_H(n)$, such that $$H_k(n) = Q_{W,k}(n) R_{W,k}(n) R_H(n) P_H^H(n), \quad (16)$$

$$= Q_{W,k}(n) R_{W,H,k}(n) P_H^H(n),$$

where $R_{WH,k}(n)$ is unitary but non-equal diagonal. Note that with this operation the diversity gain may be slightly decreased, however better performance is achieved than the decomposition based on (14).

Described now is an exemplary embodiment of a receiver for use with a precoded beamforming method.

In a typical system a set of codewords are shared between the transmitter and the receiver. From a codebook $X_c$ the best beamforming matrix index for each subcarrier is sent back to the transmitter (in the conventional approach based on the SVD decomposition). Since an exemplary goal of this invention is to find the beamforming matrix index independent of the subcarrier index, the following criterion (see M. Herdin, N. Czink, H. Ozcelik, and E. Bonek, "CORRELATION MATRIX DISTANCE, A MEANINGFUL MEASURE FOR EVALUATION OF NON-STATIONARY MIMO CHANNELS," in *VTC2005-Spring*, pp. 136-140, June 2005) is used:

$$i^* = \text{argmax} \Delta_i, \Delta_i \triangleq \frac{\text{trace}(P_H^H(n) \tilde{P}_i)}{\|P_H^H(n)\|_f |\tilde{P}_i\|_f}, \quad (17)$$

where $\forall \tilde{P}_i \in X_c$ and $\|.\|_f$ denotes the Frobenius norm. Note that since the optimum beamforming matrix satisfies $P_H^H(n) \tilde{P}_i = 1$, then $\Delta_i \leq 1$.

Having obtained the best beamforming matrix $\tilde{P}_i^*$, it is applied to the transmitted symbol $s_k(n)$, such that the received vector signal at the k-th subcarrier after eliminating CP, and applying DFT, becomes $$r_k(n) = H_k(n) \tilde{P}_i^* s_k(n) + n_k(n), \quad (18)$$

$$= Q_{W,k}(n) R_{W,H,k}(n) P_H^H(n) \tilde{P}_i^* s_k(n) + n_k(n),$$

$$= Q_{W,k}(n) R_{W,H,k}(n) s_k(n) +$$

$$Q_{W,k}(n) R_{W,H,k}(n) (P_H^H(n) \tilde{P}_i^* - I) s_k(n) + n_k(n),$$

$$= Q_{W,k}(n) R_{W,H,k}(n) s_k(n) + \tilde{n}_k(n),$$

where $\tilde{n}_k(n) \triangleq Q_{W,k}(n) R_{W,H,k}(n) (P_H^H(n) \tilde{P}_i^* - I) s_k(n) + n_k(n)$. The covariance of a modified vector noise $\tilde{n}_k(n)$ is $$E\{\tilde{n}_k(n) \tilde{n}_k(n)^H\} = Q_{W,k}(n) R_{W,H,k}(n) (P_H^H(n) \tilde{P}_i^* - I) \quad (19)$$

$$(P_H^H(n) \tilde{P}_i^* - I)^H R_{W,H,k}(n)^H Q_{W,k}(n)^H + \frac{2N_O}{T_s} I.$$

Based on this covariance, a noise whitening process is applied to (18):

$$L_k^{-1}(n)r_k(n)=L_k^{-1}(n)Q_{W,k}(n)R_{W,H,k}(n)s_k(n)+L_k^{-1}(n)n_k(n),$$

$$y_k(n)=L_k^{-1}(n)Q_{W,k}(n)R_{W,H,k}(n)s_k(n)+z_k(n), \quad (20)$$

where $E\{\tilde{n}_k(n)\tilde{n}_k(n)^H\}=L_k(n)L_k(n)^H$. Note that as $P_H^H(n)\tilde{P}_i \approx I$ one has $$E\{\tilde{n}_k(n)\tilde{n}_k(n)^H\} \approx \frac{2N_O}{T_\varepsilon}I. \quad (21)$$

This condition can be met when there are a sufficient number of codewords in the codebook. Now based on (20) one may apply either the QRD-M algorithm (e.g., as in K. J. Kim, J. Yue, R. A. Iltis, and J. D. Gibson, "A QRD-M/KALMAN FILTER-BASED DETECTION AND CHANNEL ESTIMATION ALGORITHM FOR MIMO-OFDM SYSTEMS," *IEEE Trans. on Wireless Communications*, vol. 4, pp. 710-721, March 2005) or the QRD-QLD algorithm (e.g., as in K. J. Kim, P. Radosavljevic, and J. Cavallaro, "QRD-QLD SEARCHING BASED SPHERE DETECTOR FOR MIMO RECEIVER", U.S. patent application Ser. No. 12/002,017, filed 14 Dec. 2007) to detect $s_k(n)$ from the received vector signal. Reference in this regard can be made to FIG. 2B, specifically blocks 32 and 34 (note that the data detection block 34 may be either a QRD-M detector (as shown) or a V-BLAST detector, as non-limiting examples).

Computer simulations were performed to confirm the performance of the beamforming approach in accordance with the exemplary embodiments of this invention. As a non-limiting example the MIMO-OFDM system was simulated as having 64 subcarriers and $N_r=N_t=2$ antennas. The MIMO channel response is generated according to a WLAN channel model with five paths ($N_f=5$).

Figure 3:
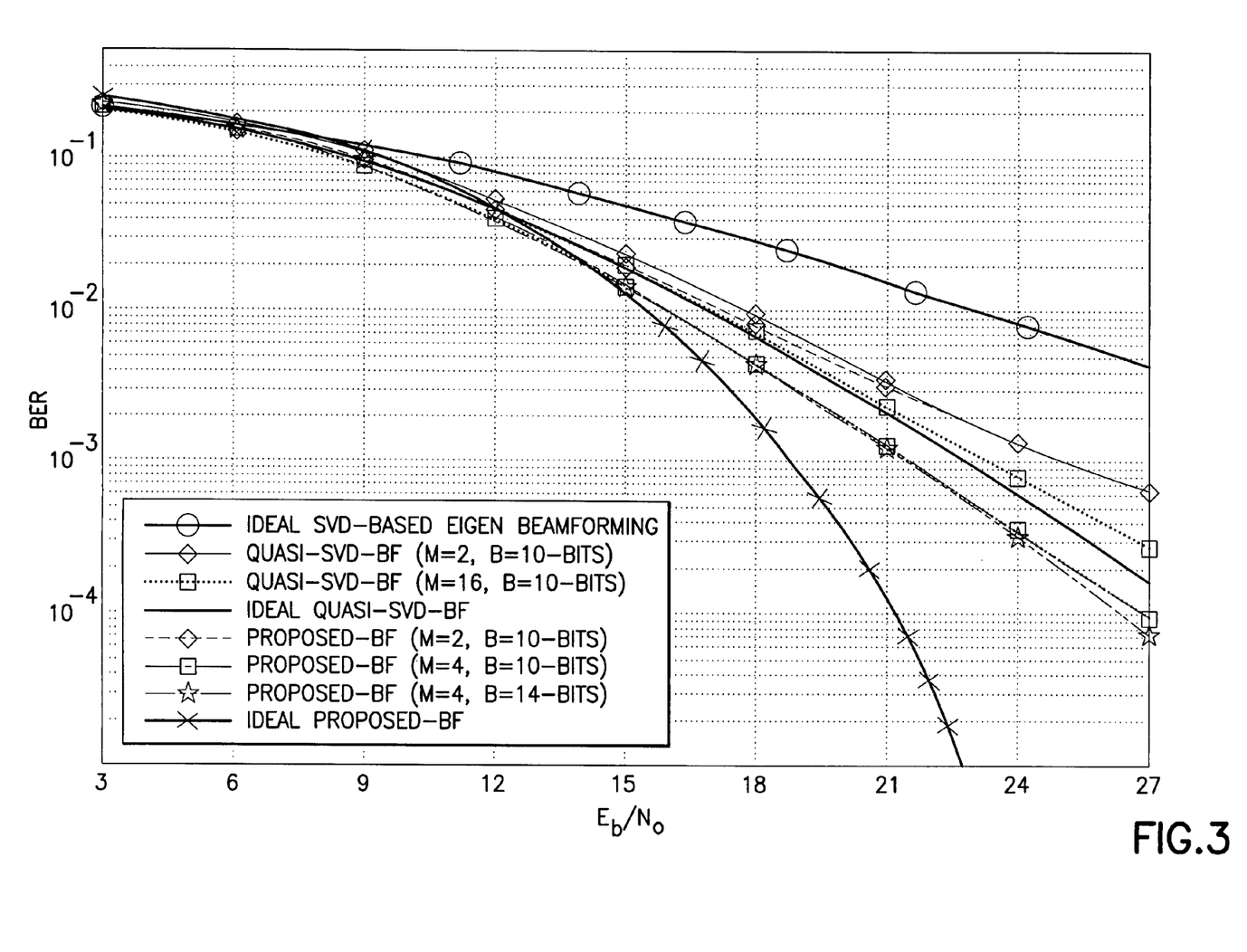
FIG. 3 is a graph of BER performance of a MIMO system with $N_t=2$, $N_r=2$ and two spatial streams, and indicates the enhancement made possible by the GMD-based beamforming approach in accordance with the exemplary embodiments of this invention.

In FIG. 3 three systems are compared:
conventional SVD-based Eigen-beamforming,
reduced beamforming based on the quasi-SVD BF approach not otherwise disclosed, and
the GMD-based beamforming approach (referred to as the proposed-BF) in accordance with the exemplary embodiments of this invention.

From the BER plot, the following can be noted. Enhanced BER performance is achieved with only 10-bits of feedback (codebook) to the transmitter side, irrespective of the number of subcarriers. Further, by using the beamforming approach in accordance with this invention, receiver complexity is reduced due at least to the small value of M for QRD-M. In fact, with the use of QRD-M with M=4 in the approach in accordance with this invention, the system shows improved performance relative to the reduced beamforming approach with an infinite bandwidth for feedback.

The MIMO beamforming approach in accordance with this invention thus provides reduced computational complexity and an enhanced BER performance in a full spatial-rate transmission system.

The use of MIMO beamforming approach in accordance with the exemplary embodiments of this invention provides a novel GMD-based closed-loop beamforming method with limited feedback, where only one feedback during a training period is sufficient for the beamforming matrix. The beamforming matrix is independent of the subcarrier index.

The use of MIMO beamforming approach in accordance with the exemplary embodiments of this invention also solves a number of problems inherent in conventional approaches. For example, in the MIMO-OFDM system the conventional beamforming is implemented on a per subcarrier basis, such that as the DFT size increases the computational burden to find the beamforming matrix and the resulting feedback requirements per subcarrier also increases. Further by example, the use of these embodiments enhances the implementation of the MIMO system in a limited feedback closed-loop environment. In addition, the use of MIMO beamforming approach in accordance with the exemplary embodiments of this invention addresses interference generated by a selected suboptimal beamforming matrix.

Figure 4:
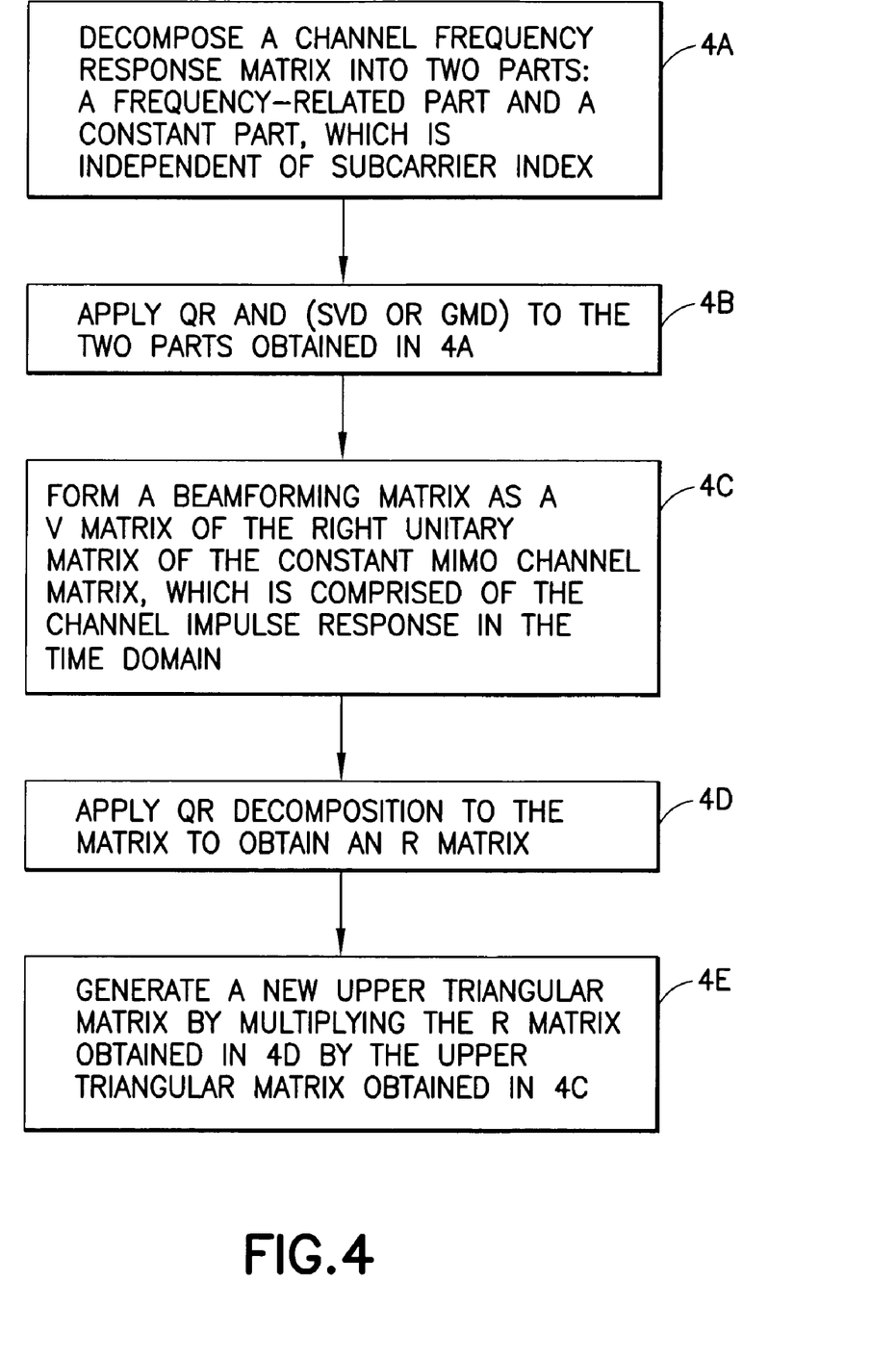
FIG. 4 is a logic flow diagram that represents the result of the performance of a method, and the execution of a computer program at the transmitter shown in FIG. 2A, in accordance with the exemplary embodiments of this invention.

Based on the foregoing it should be apparent that the exemplary embodiments of this invention provide, as shown in FIG. 4, a method, apparatus and a computer program at the transmitter to (Block 4A) decompose a channel frequency response matrix into two parts: a frequency-related part and a constant part, which is independent of subcarrier index; (Block 4B) apply QR and GMD to the two parts obtained in Block 4A; (Block 4C) form a beamforming matrix as a V matrix of the right unitary matrix of the constant MIMO channel matrix, which is comprised of the channel impulse response in the time domain; (Block 4D) apply QR decomposition to the matrix to obtain an R matrix; and (Block 4E) generate a new upper triangular matrix by multiplying the R matrix obtained in Block 4D by the upper triangular matrix obtained in Block 4C. In 4A, we can use also SVD based approach to obtain the subcarrier independent part.

Figure 5:
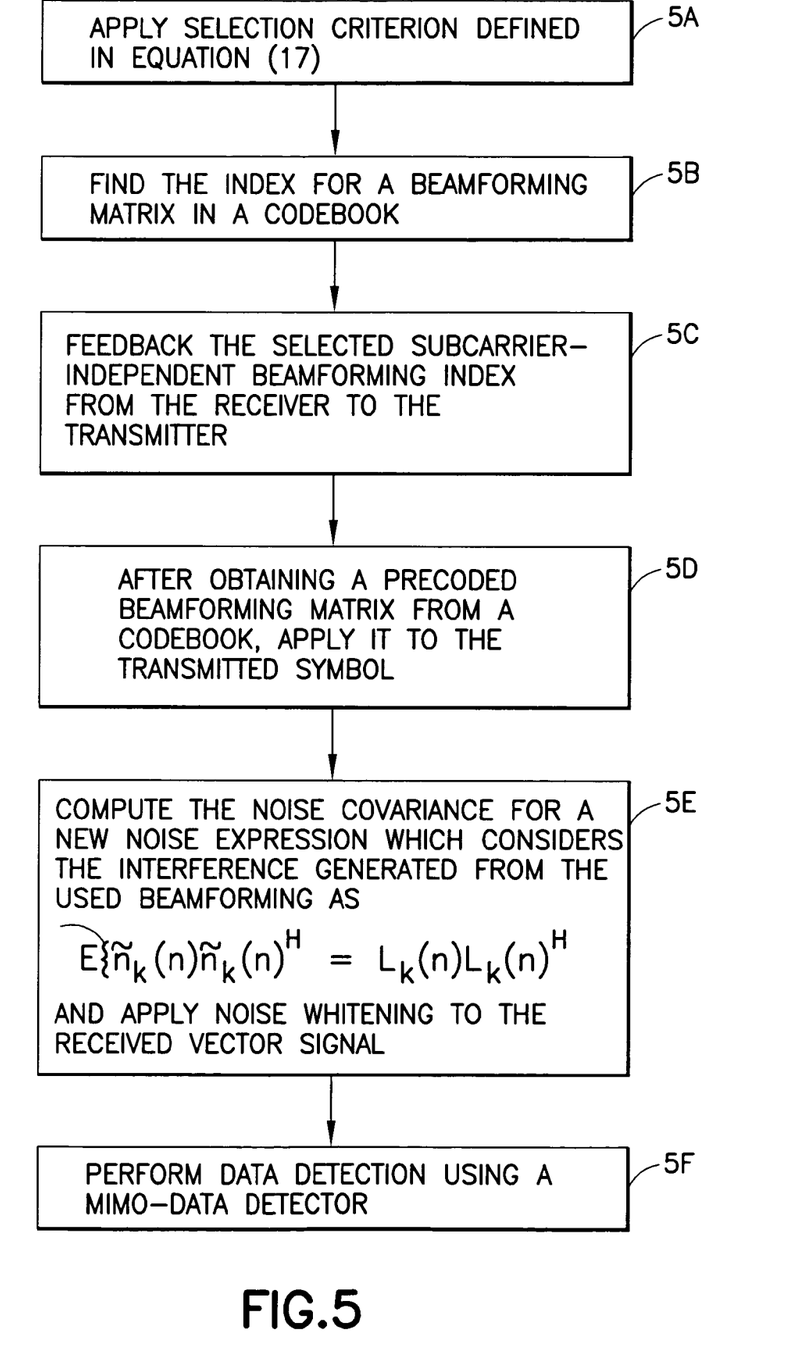
FIG. 5 is a logic flow diagram that represents the result of the performance of a method, and the execution of a computer program at the receiver shown in FIGS. 2A and 2B, in accordance with the exemplary embodiments of this invention.

Based on the foregoing it should also be apparent that the exemplary embodiments of this invention provide, as shown in FIG. 5, a method, apparatus and a computer program at the receiver to (Block 5A) apply the selection criterion defined in Equation (17); (Block 5B) find the index for a beamforming matrix in a codebook; (Block 5C) feedback the selected subcarrier-independent beamforming index from the receiver to the transmitter; (Block 5D) after obtaining a precoded beamforming matrix from a codebook, apply it to the transmitted symbol; (Block 5E) compute the noise covariance for a new noise expression which considers the interference generated from the used beamforming as $E\{\tilde{n}_k(n)\tilde{n}_k(n)^H\}=L_k(n)L_k(n)^H$ and apply noise whitening to the received vector signal; and (Block 5F) perform data detection using a MIMO-data detector. The MIMO-data detector may be, for example, a QRD-M detector or a V-BLAST detector, as non-limiting examples.

The various blocks shown in FIGS. 4 and 5 may be viewed as method steps, and/or as operations that result from operation of computer program code, and/or as a plurality of coupled logic circuit elements that are constructed to carry out the associated function(s). Such logic circuit elements may be embodied in one or more integrated circuit packages or modules.

The exemplary embodiments thus provide a MIMO-related method, apparatus and computer program that employ novel channel matrix decomposition in the frequency domain, which decomposes into a frequency bearing part and into a constant part, which is independent of subcarrier index.

The exemplary embodiments thus also provide a MIMO-related method, apparatus and computer program that use separated QR and (SVD or GMD) operations to obtain a constant beamforming matrix.

The exemplary embodiments thus also provide a MIMO-related method, apparatus and computer program that use a beamforming matrix criterion which is independent of the subcarrier index.

The exemplary embodiments thus also provide a MIMO-related method, apparatus and computer program that use an interference cancellation technique at the receiver to compensate for the use of an imperfect beamforming matrix selected from a codebook.

The exemplary embodiments thus also provide a MIMO-related method, apparatus and computer program that employ a noise whitening process to assure proper receiver operation.

The exemplary embodiments of this invention may be used to advantage in a number of wireless communications systems and embodiments where high performance closed-loop beamforming, with constrained or limited closed-loop feedback, is desirable, including, but not limited to, WIMAX, WLAN, LTE systems and standards, as well as to future wireless standardizations such as IMT-advance using the OFDM waveform.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   decomposing a multiple input multiple output channel frequency response matrix into a frequency-related part and into a constant part, where the constant part is independent of a subcarrier index and of a total number of subcarriers used in one symbol interval over which the channel frequency response matrix remains constant;
   applying separated QR decomposition and either singular value decomposition or geometric means decomposition to the frequency-related part and the constant part, respectively;
   obtaining a right unitary (R) matrix from the said singular value decomposition or geometric mean decomposition applied to the constant part of the channel frequency response matrix, where the constant part of the channel frequency response matrix comprises channel impulse responses in a time domain; and
   applying the QR decomposition to the constant part of the channel frequency response matrix to generate a beamforming matrix (V).

2. The method of claim 1, further comprising detecting, using the generated beamforming matrix (V) and no further beamforming matrices, a signal $s_k(n)$ that is received over a multiple input multiple output channel represented by the channel frequency response matrix, wherein k denotes a subcarrier and n denotes a transmitted OFDM block.

3. The method of claim 2, where the beamforming matrix (V) is further generated using feedback obtained during one training period.

4. The method of claim 2, wherein detecting the received signal is by a general multiple input multiple output MIMO data detector.

5. An apparatus comprising:
   a processor and a non-transitory memory storing a computer program which together are configured to cause the apparatus to:
   decompose a multiple input multiple output channel frequency response matrix into a frequency-related part and into a constant part, where the constant part is independent of a subcarrier index and of a total number of subcarriers used in one symbol interval over which the channel frequency response matrix remains constant;
   apply separated QR decomposition and either singular value decomposition or geometric means decomposition to the frequency-related part and the constant part;
   obtain a right unitary matrix (R) from the said either singular value decomposition or geometric mean decomposition applied to the constant part of the channel frequency response matrix, where the constant part of the channel frequency response matrix comprises channel impulse responses in a time domain; and
   apply the QR decomposition to the constant part of the constant channel frequency response matrix to generate a beamforming matrix (V).

6. The apparatus of claim 5, further comprising a detector configured to detect, using the generated beamforming matrix (V) and no further beamforming matrices, a signal $s_k(n)$ received over a multiple input multiple output channel represented by the channel frequency response matrix, wherein k denotes a subcarrier and n denotes a transmitted OFDM block.

7. The apparatus of claim 6, further comprising a receiver configured to receive feedback during training periods, and wherein the non-transitory memory storing a computer program is configured with the processor to form the beamforming matrix from feedback received at the receiver during one training period.

8. The apparatus of claim 7, wherein the detector comprises a multiple input multiple output MIMO data detector.

* * * * *